United States Patent
Takeuchi et al.

(10) Patent No.: US 9,812,733 B2
(45) Date of Patent: Nov. 7, 2017

(54) SOLID ELECTROLYTE AND SECONDARY BATTERY

(71) Applicants: Shigeo Takeuchi, Kanagawa (JP); Hajime Yuzurihara, Kanagawa (JP); Ryoji Kanno, Tokyo (JP)

(72) Inventors: Shigeo Takeuchi, Kanagawa (JP); Hajime Yuzurihara, Kanagawa (JP); Ryoji Kanno, Tokyo (JP)

(73) Assignees: RICOH COMPANY, LTD., Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 400 days.

(21) Appl. No.: 14/612,372

(22) Filed: Feb. 3, 2015

(65) Prior Publication Data
US 2015/0249263 A1  Sep. 3, 2015

(30) Foreign Application Priority Data

Feb. 28, 2014 (JP) .................. 2014-038548
Sep. 12, 2014 (JP) .................. 2014-185818

(51) Int. Cl.
*H01M 6/18* (2006.01)
*H01M 10/0562* (2010.01)
*H01M 10/39* (2006.01)
*H01B 1/10* (2006.01)
*H01M 10/054* (2010.01)

(52) U.S. Cl.
CPC .......... *H01M 10/0562* (2013.01); *H01B 1/10* (2013.01); *H01M 10/3918* (2013.01); *H01M 10/054* (2013.01); *H01M 2300/002* (2013.01); *H01M 2300/0068* (2013.01)

(58) Field of Classification Search
CPC ......... H01M 10/0562; H01M 10/3918; H01M 10/054; H01M 2300/002; H01M 2300/0068; H01B 1/10
See application file for complete search history.

(56) References Cited

U.S. PATENT DOCUMENTS

2013/0040208 A1* 2/2013 Kanno .................... C01B 17/20
                                                      429/319

FOREIGN PATENT DOCUMENTS

| JP | 11-176472 | 7/1999 |
|----|-----------|--------|
| JP | 2012-121789 | 6/2012 |
| JP | 2013-087002 | 5/2013 |
| WO | WO2011/118801 A1 | 9/2011 |

OTHER PUBLICATIONS

A. Hayashi, K. Noi, A. Sakuda, and M. Tatsumisago, Superionic Glass-Ceramic Electrolytes for Room-Temperature Rechargeable Sodium Batteries, Nature Communications, 3 (2012) 856: 1-5.

* cited by examiner

*Primary Examiner* — Raymond Alejandro
(74) *Attorney, Agent, or Firm* — Cooper & Dunham LLP (57) ABSTRACT

Provided is a sulfide-based solid electrolyte, including: a Na element; a Ge element; a P element; and a S element, wherein an atomic percentage (at. %) of each of the Na element, the Ge element, the P element, and the S element is as follows when a total of the respective elements is 100 at. %,
Na: from 38.8 at. % to 48.4 at. %
Ge: from 0.5 at. % to 8.9 at. %
P: from 3.9 at. % to 7.9 at. %
S: from 43.6 at. % to 48.6 at. %.

9 Claims, 4 Drawing Sheets

SOLID ELECTROLYTE AND SECONDARY BATTERY

BACKGROUND OF THE INVENTION

Field of the Invention

The present invention relates to a sulfide-based solid electrolyte, and a secondary battery including the solid electrolyte.

Description of the Related Art

Based on sodium, which is a low environmentally-hazardous material, sodium secondary batteries are expected as low-cost next-generation batteries. In sodium-sulfur batteries (NaS batteries) used for day and night load leveling, etc. as a large-scale power storage, β-alumina has been used as a solid electrolyte up until now. In order for the solid electrolyte to maintain sodium ion conductivity, the operation temperature of the battery has been limited to a high temperature equal to or higher than 300° C.

In this context, use of $Na_3PS_4$, which is a material having a high conductivity of $10^{-4}$ $Scm^{-1}$ at room temperature, as a solid electrolyte has made it possible for sodium-sulfur batteries, which have been able to operate only at a high temperature, to operate at room temperature (see "A. Hayashi, K. Noi, A. Sakuda, and M. Tatsumisago, Superionic Glass-Ceramic Electrolytes for Room-Temperature Rechargeable Sodium Batteries, Nature Communications, 3 (2012) 856: 1-5"). However, the ionic conductivity of a solid electrolyte of lithium secondary batteries, which are expected as power storage batteries likewise, is about $10^{-3}$ $Scm^{-1}$, which is higher by one digit (see International Publication No. WO 2011/118801). Such a high ionic conductivity that lowers the resistance in the battery is very advantageous for apparatuses requiring a high current.

Hence, it is requested to further improve the Na ion conductivity of a solid electrolyte of sodium secondary batteries, likewise.

SUMMARY OF THE INVENTION

The present invention aims to provide a solid electrolyte used in a sodium battery, and particularly to provide a solid electrolyte for a sodium secondary battery that has a conductivity comparable to that of a solid electrolyte of a lithium secondary battery.

As a result of earnest studies, the present inventors have discovered that the problem described above can be solved by adjusting the composition ratio of a Na—Ge—P—S-based sulfide material, and thus have completed the present invention.

Means for solving the problem described above is as described below.

A sulfide-based solid electrolyte, including:
a Na element;
a Ge element;
a P element; and
a S element,
wherein an atomic percentage (at. %) of each of the Na element, the Ge element, the P element, and the S element is as follows when a total of the respective elements is 100 at. %,
Na: from 38.8 at. % to 48.4 at. %
Ge: from 0.5 at. % to 8.9 at. %
P: from 3.9 at. % to 7.9 at. %
S: from 43.6 at. % to 48.6 at. %.

The Na—Ge—P—S-based solid electrolyte of the present invention exhibits a high conductivity for sodium ions.

DETAILED DESCRIPTION OF THE INVENTION (Sulfide-Based Solid Electrolyte)

A sulfide-based solid electrolyte of the present invention is a sulfide-based solid electrolyte containing a Na element, a Ge element, a P element, and a S element, wherein when a total of the Na element, the Ge element, the P element, and the S element is 100 at. %, an atomic percentage (at. %) of Na is from 38.8 at. % to 48.4 at. %, an atomic percentage (at. %) of Ge is from 0.5 at. % to 8.9 at. %, an atomic percentage (at. %) of P is from 3.9 at. % to 7.9 at. %, and an atomic percentage (at. %) of S is from 43.6 at. % to 48.6 at. %.

Figure 1:
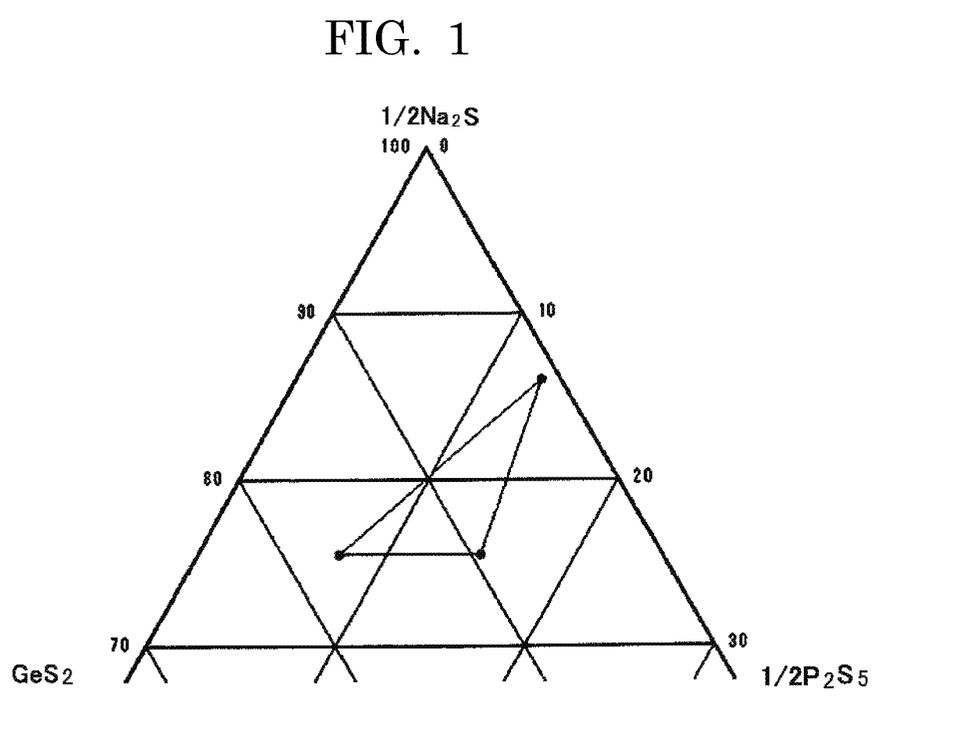
FIG. 1 is a $Na_2S$—$GeS_2$—$P_2S_5$ ternary composition diagram showing the range of the composition of a sulfide-based solid electrolyte of the present invention.
Figure 2:
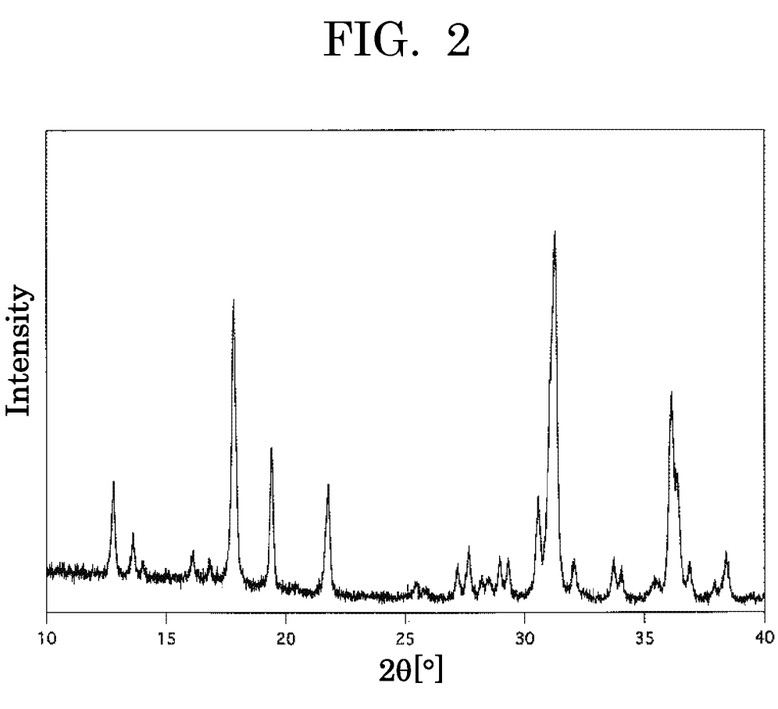
FIG. 2 is an X-ray diffraction diagram of a sulfide-based solid electrolyte of Example 11 of the present invention.

For example, when starting materials for synthesis are sodium sulfide ($Na_2S$), germanium disulfide ($GeS_2$), and diphosphorus pentasulfide ($P_2S_5$), the percentages described above fall within the range indicated by diagonal lines in the $Na_2S$—$GeS_2$—$P_2S_5$ ternary composition diagram of FIG. 1.

Further, when a total of the Na element, the Ge element, the P element, and the S element is 100 at. %, it is preferable that an atomic percentage (at. %) of Na be from 40.4 at. % to 44.3 at. %, an atomic percentage (at. %) of Ge is from 3.3 at. % to 6.7 at. %, an atomic percentage (at. %) of P is from 5.5 at. % to 6.7 at. %, and an atomic percentage (at. %) of S is from 45.6 at. % to 47.4 at. %.

The starting materials for synthesizing the sulfide-based solid electrolyte are not particularly limited, and arbitrary starting materials may be selected according to the purpose. Examples thereof include sodium, germanium, sulfur, phosphorus, sodium sulfide ($Na_2S$), germanium sulfide (GeS, $GeS_2$), and phosphorus sulfide ($P_4S_3$, $P_2S_5$, $P_4S_7$). Among these, sodium sulfide ($Na_2S$), germanium disulfide ($GeS_2$), and diphosphorus pentasulfide ($P_2S_5$) are preferable.

The method for synthesizing the sulfide-based solid electrolyte of the present invention is not particularly limited, and an arbitrary method may be selected according to the purpose. Examples thereof include a method of mixing the starting materials, and then burning them at 300° C. to 600° C. After burned at 300° C. to 600° C., the sample may be quenched with water or the like, or may be cooled to room temperature slowly. Further, the materials may be burned at 400° C. to 800° C. for improving crystallinity, or may be burned at 200° C. to 500° C. for annealing.

The method for synthesizing the sulfide-based solid electrolyte of the present invention is not particularly limited, and an arbitrary method may be selected according to the purpose. For example, the sulfide-based solid electrolyte can be obtained by mixing the starting materials, and then burning them at 300° C. to 1,000° C. After burned at 300° C. to 1,000° C., the sample may be quenched with water or the like, or may be cooled to room temperature slowly. Further, the materials may be annealed at 200° C. to 500° C.

The sulfide-based solid electrolyte of the present invention is not particularly limited, and an arbitrary sulfide-based solid electrolyte may be selected according to the purpose. The sulfide-based solid electrolyte of the present invention has characteristic peaks at diffraction angles (2θ) of about 12.8°, 17.8°, 19.4°, 21.7°, 27.3°, 29.2°, 30.6°, 31.3°, and 36.1° in a powder X-ray diffraction measurement using a Cu—Kα ray having an X-ray wavelength of 1.5418 angstroms.

"Conductivity" used herein means ionic conductivity of Na ions. In the following description, "conductivity of Na ions" may be referred to simply as "ionic conductivity" or "conductivity".

The solid electrolyte of the present invention may contain any other solid electrolyte than the sulfide-based solid electrolyte, unless a high conductivity attributed to the sulfide-based solid electrolyte is inhibited.

The ionic conductivity of the sulfide-based solid electrolyte is measured by, for example, a well-known alternating current impedance method. The sulfide-based solid electrolyte may be used in combination with any other solid electrolyte, unless a high conductivity attributed to the sulfide-based solid electrolyte is inhibited.

The sulfide-based solid electrolyte has a Na ion conductivity of preferably $1.5 \times 10^{-4}$ S/cm or higher, and more preferably $2.0 \times 10^{-4}$ S/cm or higher at 25° C.

(Secondary Battery)

A secondary battery of the present invention includes a positive electrode, a negative electrode, and the solid electrolyte described above, and further includes other members according to necessity. It is preferable that the secondary battery be a sodium secondary battery.

Examples of the positive electrode include sulfur, metal sulfides such as titanium sulfide, and sodium metallates such as sodium cobaltate, sodium manganate, and sodium nickelate.

Examples of the negative electrode include electrodes containing an electrode active material selected from materials that can be doped and undoped with, for example, a sodium metal, a sodium alloy, and a sodium ion.

The sulfide-based solid electrolyte of the present invention described above is used as the solid electrolyte.

The secondary battery of the present invention may be a primary battery.

Examples of the shape of the secondary battery include a coin shape, a cylindrical shape, and a block shape, depending on the shape of a container.

EXAMPLES

The present invention will be described below in more detail based on Examples.

Note that it is easy for a so-called person skilled in the art to make appropriate alterations and modifications to Examples of the present invention presented below to obtain other embodiments. Such alterations and modifications are included within the present invention, and the following description is an example of a preferable embodiment of the present invention and not to limit the present invention.

In the Examples below, the total of the additive amounts of starting materials is adjusted to "1.00 g". However, what with rounding off the number at the third decimal place, the total amount may be "1.01 g" or "0.99 g" in some case.

Example 1

—Production of Solid Electrolyte 1—

As starting materials, sodium sulfide ($Na_2S$), germanium disulfide ($GeS_2$), and diphosphorus pentasulfide ($P_2S_5$) were weighed out in the additive amounts described below in a glove box in an argon atmosphere, mixed with an agate mortar for 10 minutes, and further mixed with a vibrational mill.

Sodium sulfide ($Na_2S$): 0.68 g
Germanium disulfide ($GeS_2$): 0.03 g
Diphosphorus pentasulfide ($P_2S_5$): 0.29 g TI-100 manufactured by CMT Co., Ltd. was used as the vibrational mill. A grinding medium made of alumina was put together with the sample in the vibrational mill, and the sample was processed at a rotational speed of 1,440 rpm for 30 minutes. The grinding medium had a rod shape with a diameter of about 5.3 cm and a length of about 3.3 cm.

After this, the processed sample (0.1 g) was formed into a pellet having a diameter of 1 mm, with a uniaxial press (P-6 manufactured by Riken Seiki Co., Ltd.) under a displayed pressure of 10 MP. The pellet was put into a quartz tube, and vacuum-encapsulated under about 30 Pa.

The vacuum-encapsulated sample was heated to 350° C. in 3 hours in an electric furnace, maintained at 350° C. for 8 hours, and then slowly cooled to room temperature. Then, again, the sample was heated to 450° C. in 3 hours in an electric furnace, maintained at 450° C. for 8 hours, and then slowly cooled to room temperature. The obtained [Solid Electrolyte 1] was used as an evaluation sample.

Example 2

—Production of Solid Electrolyte 2—

[Solid Electrolyte 2] was produced in the same manner as in Example 1, except that the additive amounts of the starting materials used in Example 1 were changed to as follows, and this was used as an evaluation sample.

Sodium sulfide ($Na_2S$): 0.65 g
Germanium disulfide ($GeS_2$): 0.09 g
Diphosphorus pentasulfide ($P_2S_5$): 0.26 g Example 3

—Production of Solid Electrolyte 3—

[Solid Electrolyte 3] was produced in the same manner as in Example 1, except that the additive amounts of the starting materials used in Example 1 were changed to as follows, and this was used as an evaluation sample.

Sodium sulfide ($Na_2S$): 0.60 g
Germanium disulfide ($GeS_2$): 0.18 g
Diphosphorus pentasulfide ($P_2S_5$): 0.22 g Example 4

—Production of Solid Electrolyte 4—

[Solid Electrolyte 4] was produced in the same manner as in Example 1, except that the additive amounts of the starting materials used in Example 1 were changed to as follows, and this was used as an evaluation sample.

Sodium sulfide ($Na_2S$): 0.55 g
Germanium disulfide ($GeS_2$): 0.26 g
Diphosphorus pentasulfide ($P_2S_5$): 0.19 g Example 5

—Production of Solid Electrolyte 5—

[Solid Electrolyte 5] was produced in the same manner as in Example 1, except that the additive amounts of the starting materials used in Example 1 were changed to as follows, and this was used as an evaluation sample.
Sodium sulfide ($Na_2S$): 0.51 g
Germanium disulfide ($GeS_2$): 0.33 g
Diphosphorus pentasulfide ($P_2S_5$): 0.16 g Example 6

—Production of Solid Electrolyte 6—
[Solid Electrolyte 6] was produced in the same manner as in Example 1, except that the additive amounts of the starting materials used in Example 1 were changed to as follows, and this was used as an evaluation sample.
Sodium sulfide ($Na_2S$): 0.48 g
Germanium disulfide ($GeS_2$): 0.38 g
Diphosphorus pentasulfide ($P_2S_5$): 0.14 g Example 7

—Production of Solid Electrolyte 7—
[Solid Electrolyte 7] was produced in the same manner as in Example 1, except that the additive amounts of the starting materials used in Example 1 were changed to as follows, and this was used as an evaluation sample.
Sodium sulfide ($Na_2S$): 0.62 g
Germanium disulfide ($GeS_2$): 0.11 g
Diphosphorus pentasulfide ($P_2S_5$): 0.28 g Example 8

—Production of Solid Electrolyte 8—
[Solid Electrolyte 8] was produced in the same manner as in Example 1, except that the additive amounts of the starting materials used in Example 1 were changed to as follows, and this was used as an evaluation sample.
Sodium sulfide ($Na_2S$): 0.56 g
Germanium disulfide ($GeS_2$): 0.20 g
Diphosphorus pentasulfide ($P_2S_5$): 0.24 g Example 9

—Production of Solid Electrolyte 9—
[Solid Electrolyte 9] was produced in the same manner as in Example 1, except that the additive amounts of the starting materials used in Example 1 were changed to as follows, and this was used as an evaluation sample.
Sodium sulfide ($Na_2S$): 0.59 g
Germanium disulfide ($GeS_2$): 0.16 g
Diphosphorus pentasulfide ($P_2S_5$): 0.25 g Example 10

—Production of Solid Electrolyte 10—
[Solid Electrolyte 10] was produced in the same manner as in Example 1, except that the additive amounts of the starting materials used in Example 1 were changed to as follows, and this was used as an evaluation sample.
Sodium sulfide ($Na_2S$): 0.54 g
Germanium disulfide ($GeS_2$): 0.24 g
Diphosphorus pentasulfide ($P_2S_5$): 0.22 g Example 11

—Production of Solid Electrolyte 11—
[Solid Electrolyte 11] was produced in the same manner as in Example 1, except that the additive amounts of the starting materials used in Example 1 were changed to as follows, and this was used as an evaluation sample.
Sodium sulfide ($Na_2S$): 0.52 g
Germanium disulfide ($GeS_2$): 0.27 g
Diphosphorus pentasulfide ($P_2S_5$): 0.21 g Example 12

—Production of Solid Electrolyte 12—
[Solid Electrolyte 12] was produced in the same manner as in Example 1, except that the additive amounts of the starting materials used in Example 1 were changed to as follows, and this was used as an evaluation sample.
Sodium sulfide ($Na_2S$): 0.51 g
Germanium disulfide ($GeS_2$): 0.29 g
Diphosphorus pentasulfide ($P_2S_5$): 0.20 g Example 13

—Production of Solid Electrolyte 13—
[Solid Electrolyte 13] was produced in the same manner as in Example 1, except that the additive amounts of the starting materials used in Example 1 were changed to as follows, and this was used as an evaluation sample.
Sodium sulfide ($Na_2S$): 0.49 g
Germanium disulfide ($GeS_2$): 0.32 g
Diphosphorus pentasulfide ($P_2S_5$): 0.20 g Example 14

—Production of Solid Electrolyte 14—
[Solid Electrolyte 14] was produced in the same manner as in Example 1, except that the additive amounts of the starting materials used in Example 1 were changed to as follows, and this was used as an evaluation sample.
Sodium sulfide ($Na_2S$): 0.55 g
Germanium disulfide ($GeS_2$): 0.19 g
Diphosphorus pentasulfide ($P_2S_5$): 0.26 g Example 15

—Production of Solid Electrolyte 15—
[Solid Electrolyte 15] was produced in the same manner as in Example 1, except that the additive amounts of the starting materials used in Example 1 were changed to as follows, and this was used as an evaluation sample.
Sodium sulfide ($Na_2S$): 0.53 g
Germanium disulfide ($GeS_2$): 0.22 g
Diphosphorus pentasulfide ($P_2S_5$): 0.25 g Example 16

—Production of Solid Electrolyte 16—
[Solid Electrolyte 16] was produced in the same manner as in Example 1, except that the additive amounts of the starting materials used in Example 1 were changed to as follows, and this was used as an evaluation sample.
Sodium sulfide ($Na_2S$): 0.52 g
Germanium disulfide ($GeS_2$): 0.24 g
Diphosphorus pentasulfide ($P_2S_5$): 0.25 g Example 17

—Production of Solid Electrolyte 17—
[Solid Electrolyte 17] was produced in the same manner as in Example 1, except that the additive amounts of the starting materials used in Example 1 were changed to as follows, and this was used as an evaluation sample.
Sodium sulfide ($Na_2S$): 0.49 g
Germanium disulfide ($GeS_2$): 0.26 g
Diphosphorus pentasulfide ($P_2S_5$): 0.24 g

Example 18

—Production of Solid Electrolyte 18—

[Solid Electrolyte 18] was produced in the same manner as in Example 1, except that the additive amounts of the starting materials used in Example 1 were changed to as follows, and this was used as an evaluation sample.
  Sodium sulfide ($Na_2S$): 0.65 g
  Germanium disulfide ($GeS_2$): 0.05 g
  Diphosphorus pentasulfide ($P_2S_5$): 0.30 g

Example 19

—Production of Solid Electrolyte 19—

[Solid Electrolyte 19] was produced in the same manner as in Example 1, except that the additive amounts of the starting materials used in Example 1 were changed to as follows, and this was used as an evaluation sample.
  Sodium sulfide ($Na_2S$): 0.60 g
  Germanium disulfide ($GeS_2$): 0.11 g
  Diphosphorus pentasulfide ($P_2S_5$): 0.29 g

Example 20

—Production of Solid Electrolyte 20—

[Solid Electrolyte 20] was produced in the same manner as in Example 1, except that the additive amounts of the starting materials used in Example 1 were changed to as follows, and this was used as an evaluation sample.
  Sodium sulfide ($Na_2S$): 0.56 g
  Germanium disulfide ($GeS_2$): 0.15 g
  Diphosphorus pentasulfide ($P_2S_5$): 0.29 g

Example 21

—Production of Solid Electrolyte 21—

[Solid Electrolyte 21] was produced in the same manner as in Example 1, except that the additive amounts of the starting materials used in Example 1 were changed to as follows, and this was used as an evaluation sample.
  Sodium sulfide ($Na_2S$): 0.50 g
  Germanium disulfide ($GeS_2$): 0.21 g
  Diphosphorus pentasulfide ($P_2S_5$): 0.29 g

Comparative Example 1

—Production of Solid Electrolyte 22 ($Na_3PS_4$)—

[Solid Electrolyte 22] was produced in the same manner as in Example 1, except that the additive amounts of the starting materials used in Example 1 were changed to as follows, and this was used as an evaluation sample.
  Sodium sulfide ($Na_2S$): 0.51 g
  Diphosphorus pentasulfide ($P_2S_5$): 0.49 g

[Evaluation]

(Measurement of Na Ion Conductivity)

The Na ion conductivity of the sulfide-based solid electrolyte is measured by, for example, a well-known alternating current impedance method. The solid electrolyte of the present invention may contain any other solid electrolyte than the sulfide-based solid electrolyte described above, unless a high conductivity attributed to the sulfide-based solid electrolyte is inhibited. The Na ion conductivity of the sulfide-based solid electrolytes obtained in Examples 1 to 21 and Comparative Example 1 was measured at 25° C.

First, a gold powder (manufactured by Nilaco Corporation, with a dendritic shape, with a particle diameter of about 10 μm) (about 10 mg) was put on both sides of the sample pellet in a glove box in an argon atmosphere, and scattered uniformly over the pellet surface. Then, the sample pellet was molded under a displayed pressure of 20 MPa (a molding pressure of about 560 MPa). After this, the obtained pellet was put inside an airtight electrochemical cell that could maintain an argon atmosphere.

For the measurement, an impedance/gain-phase analyzer (SOLARTRON 1260) manufactured by Solartron Public Co., Ltd. was used as a frequency response analyzer FRA, and a compact environment tester (SU-241 manufactured by Espec Corp.) was used as a constant-temperature unit.

The measurement was started from high-frequency regions, under the conditions of an alternating current voltage of from 10 mV to 1,000 mV, a frequency range of from 1 Hz to 10 MHz, a cumulative time of 0.2 seconds, and a temperature of 25° C.

Figure 3:
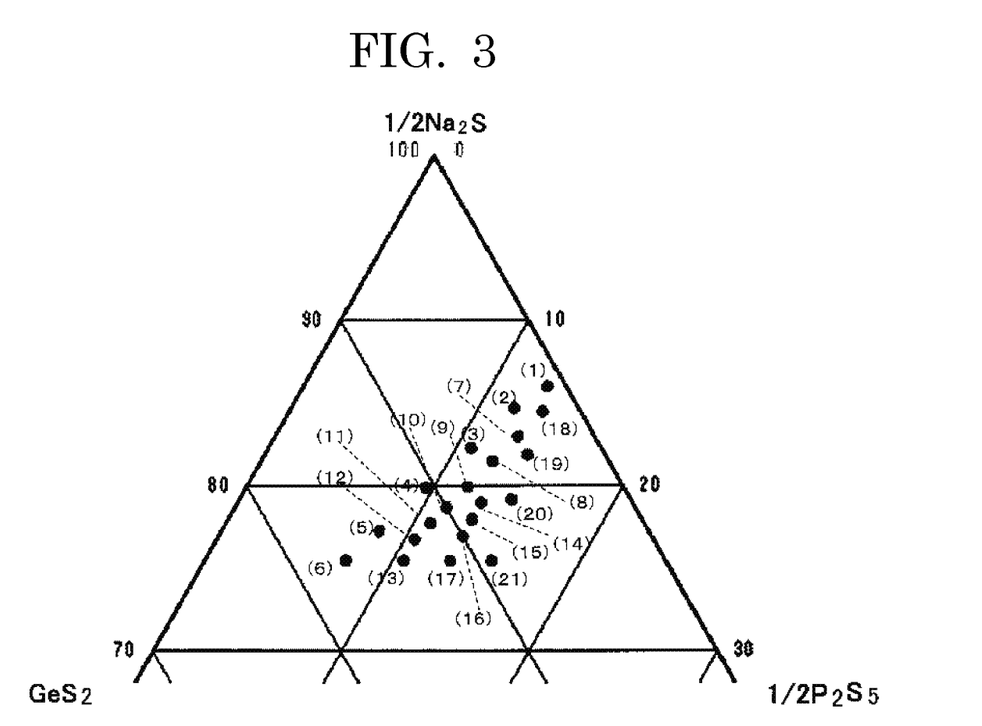
FIG. 3 is a $Na_2S$—$GeS_2$—$P_2S_5$ ternary composition diagram showing the range of the compositions of Examples and Comparative Examples.

The measured points were plotted as black dots (•) in the $Na_2S$—$GeS_2$—$P_2S_5$ ternary composition diagram of FIG. 3. In FIG. 3, the numbers in the parentheses indicate the numbers of the solid electrolytes of Examples and Comparative Example. Further, conductivities were measured, and the obtained results are shown in Table 1.

(X-Ray Diffraction Measurement of Solid Electrolytes)

In a glove box in an argon atmosphere, the solid electrolytes of Examples 1 to 21 and Comparative Example 1 described above were put in a stainless container that was air-tightly sealed with a paraffin film, and subjected to X-ray diffraction measurement using a CuKα ray. For the measurement, SMART-LAB manufactured by Rigaku Corporation was used, a tube voltage was set to 40 kV, and a tube current was set to 200 mA.

Regarding diffraction peaks that were measured by the X-ray diffraction measurement and appeared in a 2θ range of from 29.30°±1.00°, a diffraction peak that appeared in a 2θ range of 28.3° or greater but less than 29.3° was defined as IA1, and a diffraction peak that appeared in a 2θ range of 29.3° or greater but less than 30.3° was defined as IA2. Further, regarding diffraction peaks that were measured by the X-ray diffraction measurement and appeared in a 2θ range of from 27.20°±1.00°, a diffraction peak that appeared in a 2θ range of 26.2° or greater but less than 27.2° was defined as IB1, and a diffraction peak that appeared in a 2θ range of 27.2° or greater but less than 28.2° was defined as IB2. Then, the ratios between these intensities were calculated as IB/IA (a total of four kinds). For cases where there was any range in which no peak appeared, the relevant intensity ratio is shown as "-".

TABLE 1

| | Additive amount [g] | | | Atomic percentage at. % | | | | Conductivity × $10^{-4}$ [S/cm] | XRD intensity ratio | | | |
|---|---|---|---|---|---|---|---|---|---|---|---|---|
| | $Na_2S$ | $GeS_2$ | $P_2S_5$ | Na | Ge | P | S | | $I_{B1}/I_{A1}$ | $I_{B1}/I_{A2}$ | $I_{B2}/I_{A1}$ | $I_{B2}/I_{A2}$ |
| Ex. 1 | 0.68 | 0.03 | 0.29 | 48.45 | 0.56 | 7.32 | 43.66 | 1.71 | — | — | 0.75 | — |
| Ex. 2 | 0.65 | 0.09 | 0.26 | 47.34 | 1.90 | 6.65 | 44.10 | 1.66 | — | — | 0.77 | — |
| Ex. 3 | 0.60 | 0.18 | 0.22 | 45.23 | 3.79 | 5.94 | 45.04 | 1.81 | — | — | 0.78 | — |

TABLE 1-continued

| | Additive amount [g] | | | Atomic percentage at. % | | | | Conductivity × 10⁻⁴ [S/cm] | XRD intensity ratio | | | |
|---|---|---|---|---|---|---|---|---|---|---|---|---|
| | Na₂S | GeS₂ | P₂S₅ | Na | Ge | P | S | | $I_{B1}/I_{A1}$ | $I_{B1}/I_{A2}$ | $I_{B2}/I_{A1}$ | $I_{B2}/I_{A2}$ |
| Ex. 4 | 0.55 | 0.26 | 0.19 | 43.20 | 5.68 | 5.19 | 45.93 | 1.94 | — | — | 0.87 | — |
| Ex. 5 | 0.51 | 0.33 | 0.16 | 41.06 | 7.60 | 4.46 | 46.88 | 2.44 | — | — | 0.89 | — |
| Ex. 6 | 0.48 | 0.38 | 0.14 | 39.63 | 8.93 | 3.94 | 47.51 | 2.46 | — | — | 0.87 | — |
| Ex. 7 | 0.62 | 0.11 | 0.28 | 45.61 | 2.22 | 7.12 | 45.05 | 2.48 | 0.84 | 0.94 | 1.37 | 1.53 |
| Ex. 8 | 0.56 | 0.20 | 0.24 | 43.01 | 4.44 | 6.33 | 46.22 | 2.95 | 0.73 | 0.67 | 1.36 | 1.25 |
| Ex. 9 | 0.59 | 0.16 | 0.25 | 44.31 | 3.33 | 6.73 | 45.63 | 3.26 | 0.78 | 0.90 | 1.30 | 1.50 |
| Ex. 10 | 0.54 | 0.24 | 0.22 | 41.97 | 5.33 | 6.01 | 46.68 | 5.89 | 0.83 | 1.25 | 1.25 | 1.88 |
| Ex. 11 | 0.52 | 0.27 | 0.21 | 41.19 | 6.00 | 5.77 | 47.03 | 9.02 | 1.22 | 1.32 | 1.54 | 1.66 |
| Ex. 12 | 0.51 | 0.29 | 0.20 | 40.40 | 6.67 | 5.54 | 47.39 | 5.81 | 0.92 | 1.17 | 1.32 | 1.67 |
| Ex. 13 | 0.49 | 0.32 | 0.20 | 39.31 | 7.24 | 5.52 | 47.93 | 2.28 | 0.82 | 1.23 | 1.04 | 1.57 |
| Ex. 14 | 0.55 | 0.19 | 0.26 | 42.02 | 4.26 | 6.91 | 46.81 | 2.95 | 0.75 | 1.33 | 0.91 | 1.60 |
| Ex. 15 | 0.53 | 0.22 | 0.25 | 41.16 | 4.75 | 6.86 | 47.23 | 3.12 | 0.64 | 1.09 | 0.81 | 1.37 |
| Ex. 16 | 0.52 | 0.24 | 0.25 | 40.31 | 5.24 | 6.81 | 47.65 | 3.28 | 0.73 | 1.14 | 0.82 | 1.29 |
| Ex. 17 | 0.49 | 0.26 | 0.24 | 39.06 | 5.90 | 6.78 | 48.27 | 2.46 | 0.75 | 1.25 | 0.85 | 1.42 |
| Ex. 18 | 0.65 | 0.05 | 0.30 | 46.94 | 1.11 | 7.50 | 44.45 | 1.98 | 0.91 | 1.11 | 0.73 | 0.89 |
| Ex. 19 | 0.60 | 0.11 | 0.29 | 44.47 | 2.23 | 7.60 | 45.70 | 2.12 | 0.83 | 1.25 | 1.04 | 1.56 |
| Ex. 20 | 0.56 | 0.15 | 0.29 | 42.03 | 3.34 | 7.69 | 46.94 | 2.15 | 0.85 | 0.95 | 0.98 | 1.10 |
| Ex. 21 | 0.50 | 0.21 | 0.29 | 38.84 | 4.73 | 7.87 | 48.56 | 2.46 | 0.80 | 1.02 | 1.04 | 1.33 |
| Comp Ex. 1 (Na₃PS₄) | 0.51 | 0.00 | 0.49 | 37.50 | 0.00 | 12.50 | 50.00 | 1.95 | — | — | — | — |

From the results shown in Table 1, it turned out that the conductivities were particularly high in a Na percentage range of from 38.8 at. % to 48.4 at. %, in a Ge percentage range of from 0.5 at. % to 8.9 at. %, in a P percentage range of from 3.9 at. % to 7.9 at. %, and in a S percentage range of from 43.6 at. % to 48.6 at. %. The maximum conductivity among Examples was 9.02×10⁻⁴ [S/cm], which was about 4.5 times as high as that of Comparative Example 1. The diffraction peak intensity ratios IB/IA (a total of four kinds) were 0.6 or higher in all of the cases.

Example 22

(Production of Electrode)

A TiS₂ powder (manufactured by Wako Pure Chemical Industries, Ltd.) as an electrode active material, acetylene black (manufactured by Denki Kagaku Kogyo Kabushiki Kaisha) as a conductive material, and polyvinylidene fluoride (PVdF manufactured by Kureha Corporation, #1300) as an electrode forming agent were weighed out such that the composition would be electrode active material:conductive material:electrode forming agent=8:1:1 (mass ratio).

First, the electrode forming agent was added to an agate mortar, and N-methyl-2-pyrrolidone (NMP manufactured by Tokyo Chemical Industry Co., Ltd.) as a solvent was added thereto in an appropriate amount. They were mixed sufficiently, and after it was confirmed that the electrode forming agent was dissolved, the electrode active material and the conductive material were added and mixed therewith sufficiently, to thereby obtain an electrode compound agent paste.

The obtained electrode compound agent paste was applied over a silver foil to a thickness of 100 μm with an applicator. The resultant was put in a vacuum dryer, and dried sufficiently with the solvent removed, to thereby obtain an electrode sheet.

The obtained electrode sheet was crimped sufficiently with a roll press, and then punched with an electrode punching machine to a diameter of 1.0 cm, to thereby obtain a positive electrode for a sodium battery.

(Production of Solid Electrolyte)

A solid electrolyte A having a disk shape with a diameter of 1.0 cm and a thickness of 0.70 mm was produced, using the solid electrolyte material produced in Example 11.

(Production of Sodium Secondary Battery)

A coin cell was used for evaluation of the above-described electrode as a battery. A battery was produced by putting, as a positive electrode, the above-described electrode in a dent of a lower part of a coin cell (manufactured by Hohsen Corp.) such that the active material side of the electrode would face upward, and by combining the solid electrolyte A, and as a negative electrode, a sodium metal (manufactured by Kanto Chemical Co., Inc.). The assembling of the battery was performed in a glove box in an argon atmosphere.

[Evaluation of Sodium Secondary Battery]

Figure 4:
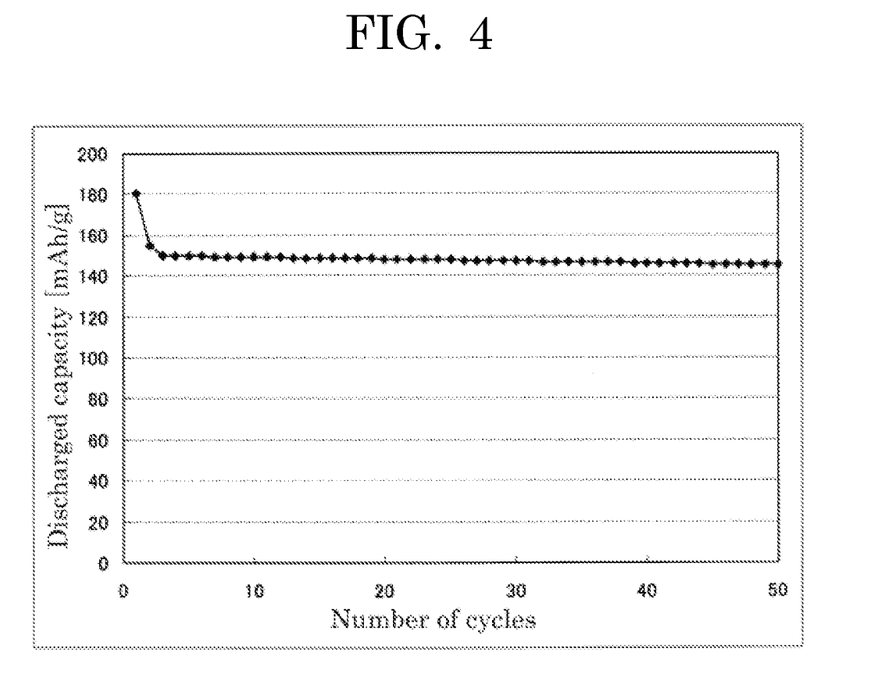
FIG. 4 is a diagram showing transitions of discharged capacity of a sodium secondary battery of Example 22 through repetition of charging and discharging cycles.

Regarding charging/discharging conditions, the sodium secondary battery was charged at a constant current of 1.0 mA/cm² from a rest potential up to 2.5 V, and discharged at a constant current of 1.0 mA/cm² to be cut off at a voltage of 1.3 V. This charging/discharging was repeated for 50 cycles. The transitions of the discharged capacity through these cycles are shown in FIG. 4.

As a result, it turned out that the sulfide-based solid electrolyte of the present invention could be used safely as a battery, because the transitions of the discharged capacity were stable.

Aspects of the present invention are as follows, for example.

<1> A sulfide-based solid electrolyte, including:
 a Na element;
 a Ge element;
 a P element; and
 a S element,
 wherein an atomic percentage (at. %) of each of the Na element, the Ge element, the P element, and the S element is as follows when a total of the respective elements is 100 at. %,
 Na: from 38.8 at. % to 48.4 at. %
 Ge: from 0.5 at. % to 8.9 at. %

P: from 3.9 at. % to 7.9 at. %
S: from 43.6 at. % to 48.6 at. %.

<2> The sulfide-based solid electrolyte according to <1>,
wherein the atomic percentage (at. %) of each of the Na element, the Ge element, the P element, and the S element is as follows,
Na: from 40.4 at. % to 44.3 at. %
Ge: from 3.3 at. % to 6.7 at. %
P: from 5.5 at. % to 6.7 at. %
S: from 45.6 at. % to 47.4 at. %.

<3> The sulfide-based solid electrolyte according to <1> or <2>,
wherein the sulfide-based solid electrolyte has peaks at 2θ positions of 29.30°±1.00° and 27.20°±1.00° when measured by X-ray diffraction measurement using a CuKα ray, and
wherein when a diffraction intensity of the peak at the 2θ position of 29.30°±1.00° is defined as IA and a diffraction intensity of the peak at the 2θ position of 27.20°±1.00° is defined as IB, a value IB/IA is 0.60 or greater.

<4> The sulfide-based solid electrolyte according to any one of <1> to <3>,
wherein the sulfide-based solid electrolyte has a Na ion conductivity of $1.5 \times 10^{-4}$ S/cm or higher at 25° C.

<5> The sulfide-based solid electrolyte according to any one of <1> to <4>,
wherein the sulfide-based solid electrolyte has a Na ion conductivity of $2.0 \times 10^{-4}$ S/cm or higher at 25° C.

<6> A secondary battery, including:
a positive electrode;
a negative electrode; and
the sulfide-based solid electrolyte according to any one of <1> to <5>.

<7> The secondary battery according to <6>,
wherein the secondary battery is a sodium secondary battery.

This application claims priority to Japanese application No. 2014-038548, filed on Feb. 28, 2014 and incorporated herein by reference, and Japanese application No. 2014-185818 filed on Sep. 12, 2014 and incorporated herein by reference.

What is claimed is:

1. A sodium-sulfur based solid electrolyte, comprising:
a Na element;
a Ge element;
a P element; and
a S element,
wherein the sodium-sulfur based solid electrolyte has a Na ion conductivity of $1.5 \times 10^{-4}$ S/cm or higher at 25° C., and
an atomic percentage (at. %) of each of the Na element, the Ge element, the P element, and the S element is as follows when a total of the respective elements in the sodium-sulfur based solid electrolyte is 100 at. %,
Na: from 38.8 at. % to 48.4 at. %
Ge: from 0.5 at. % to 8.9 at. %
P: from 3.9 at. % to 7.9 at. %
S: from 43.6 at. % to 48.6 at. %.

2. The sodium-sulfur based solid electrolyte according to claim 1,
wherein the atomic percentage (at. %) of each of the Na element, the Ge element, the P element, and the S element is as follows,
Na: from 40.4 at. % to 44.3 at. %
Ge: from 3.3 at. % to 6.7 at. %
P: from 5.5 at. % to 6.7 at. %
S: from 45.6 at. % to 47.4 at. %.

3. The sodium-sulfur based solid electrolyte according to claim 1,
wherein the sodium-sulfur based solid electrolyte has peaks at 2θ positions of 29.30°±1.00° and 27.20°±1.00° when measured by X-ray diffraction measurement using a Cu-Kα ray, and
wherein when a diffraction intensity of the peak at the 2θ position of 29.30°±1.00° is defined as IA and a diffraction intensity of the peak at the 2θ position of 27.20°±1.00° is defined as IB, a value IB/IA is 0.60 or greater.

4. The sodium-sulfur based solid electrolyte according to claim 1,
wherein the sodium-sulfur based solid electrolyte has a Na ion conductivity of $2.0 \times 10-4$ S/cm or higher at 25° C.

5. The sodium-sulfur based solid electrolyte according to claim 1, wherein starting materials for the sodium-sulfur based solid electrolyte include $Na_2S$.

6. A sodium secondary battery, comprising:
a positive electrode;
a negative electrode; and
a solid electrolyte,
wherein the solid electrolyte in the sodium secondary battery comprises:
a Na element;
a Ge element;
a P element; and
a S element,
wherein an atomic percentage (at. %) of each of the Na element, the Ge element, the P element, and the S element is as follows when a total of the respective elements is 100 at. %,
Na: from 38.8 at. % to 48.4 at. %
Ge: from 0.5 at. % to 8.9 at. %
P: from 3.9 at. % to 7.9 at. %
S: from 43.6 at. % to 48.6 at. %.

7. The sodium secondary battery according to claim 6,
wherein the positive electrode of the sodium secondary battery includes one or more sodium metallates.

8. The sodium secondary battery according to claim 6, wherein the positive electrode of the sodium secondary battery includes one or more sodium metallates selected from a group consisting of sodium cobaltate, sodium manganate, and sodium nickelate.

9. The sodium secondary battery according to claim 6, wherein the negative electrode of the sodium secondary battery includes an active material selected from a group consisting of a sodium metal, a sodium alloy, and a sodium ion.

* * * * *